No. 856,671. PATENTED JUNE 11, 1907.
J. BEHRINGER.
COOKING UTENSIL.
APPLICATION FILED FEB. 15, 1907.
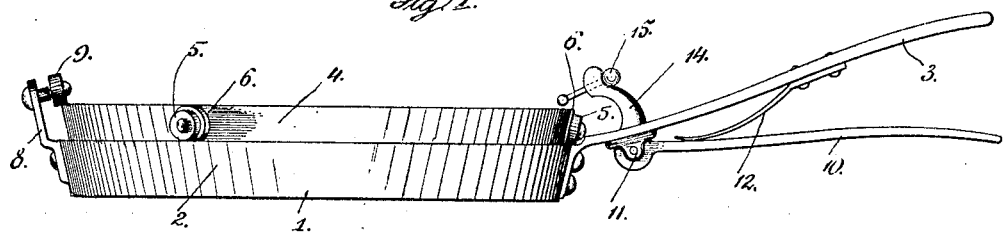
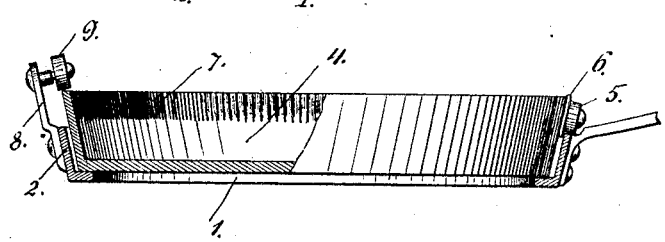
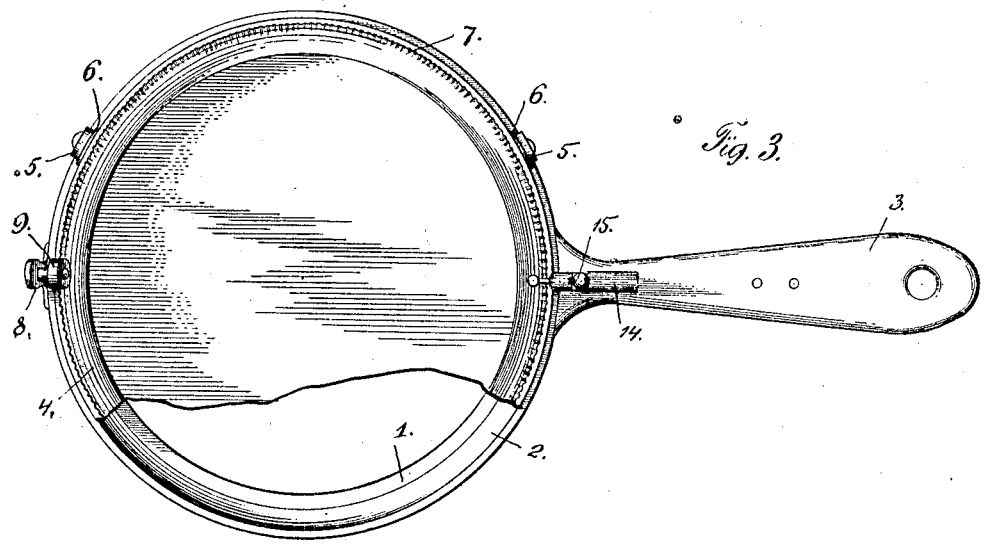
WITNESSES:
A. H. Rabsag,
INVENTOR
John Behringer,
BY
Attorneys

UNITED STATES PATENT OFFICE.

JOHN BEHRINGER, OF CHICAGO, ILLINOIS.

COOKING UTENSIL.

No. 856,671.  Specification of Letters Patent.  Patented June 11, 1907.

Application filed February 15, 1907. Serial No. 357,452.

*To all whom it may concern:*

Be it known that I, JOHN BEHRINGER, a citizen of the United States of America, residing at Chicago, in the county of Cook and State of Illinois, have invented certain new and useful Improvements in Cooking Utensils, of which the following is a specification, reference being had therein to the accompanying drawing.

This invention relates to cooking utensils, and the invention has for its object to provide a novel form of skillet for cooking and preparing food whereby danger of burning the food during the cooking operation is reduced to a minimum.

Another object of this invention is to provide a cooking utensil having a revoluble receptacle for food adapted to facilitate the thorough cooking of food placed therein.

To this end, I have devised a cooking utensil having an auxiliary revoluble food receptacle which is detachably held, whereby the same can be easily and quickly removed for cleansing purposes, yet held in engagement with the utensil when the same is not being used. In this connection, my improved cooking utensil is designed for uneven heating mediums, where a portion of food such as meat is liable to be cooked or finished upon one edge previous to its opposite edge, thus necessitating the moving of the food in order to insure all parts being equally cooked and prepared.

My invention aims to obviate the necessity of moving a portion of food such as meat during its preparation, thus retaining the juice or essence of the food until its preparation has been completed.

The detail construction of my improved cooking utensil will be hereinafter more fully described and then specifically pointed out in the appended claims, and referring to the drawing forming part of this specification, like numerals of reference designate corresponding parts throughout the several views, in which:—

Figure 1 is a side elevation of my improved cooking utensil, Fig. 2 is a vertical sectional view of the same partly in elevation and partly broken away, Fig. 3 is a plan of the cooking utensil partly broken away.

To put my invention into practice, I construct my improved utensil of a ring or annulus 1 having inclined side walls 2 provided with a conventional form of handle 3. Revolubly supported upon the side walls 2 of the annulus or ring 1 is a receptacle 4 corresponding to an ordinary frying pan, said receptacle being revolubly supported by rollers 5 carried by said receptacle, said rollers being flanged as at 6 to prevent the receptacle from contacting with the side walls 2 of the annulus or ring 1.

The inner upper edges of the receptacle 4 are serrated or notched as at 7, whereby a fork, knife or similar instrument can be employed for rotating the receptacle 4, the instrument being placed in one of the serrations 7 to rotate the receptacle 4.

The bottom of the receptacle 4 will be subjected to the action of the fire over which the cooking utensil is placed, and in order to retain said receptacle in engagement with the annulus or ring 1 when the same is moved, I provide the side walls 2 of the annulus or ring 1 with an upwardly extending bracket 8 carrying a revoluble roller 9 adapted to bear upon the upper edges of the receptacle 4. The revoluble roller 9 is preferably located diametrically opposite the handle 3, and in order to hold the receptacle adjacent to the handle, I provide said handle with a bell crank lever pivotally connected to the handle 3 as at 11, and having the long arm 10 thereof normally held in a substantially horizontal position by a spring 12 carried by handle 3. The shorter arm 14 of said bell crank lever is provided with a movable pin 15 adapted to engage the upper edge of the receptacle 4, opposite the roller 9 and hold said receptacle upon the annulus or ring 1 when the same is tilted or moved.

From the foregoing description taken in connection with the drawing, it will be observed that I have devised a simple and inexpensive cooking utensil normally supported in a revoluble position, whereby the same can be easily and quickly moved to insure a perfect preparation of food placed within said receptacle.

It is obvious that the pivoted bell crank lever can be dispensed with where it is not desired to retain the cooking utensil in engagement with the annulus or ring 1, and while I have employed the flanged rollers 5 for supporting and spacing the cooking utensil upon the annulus or ring 1, I desire it to be understood that other mechanical equivalents can be readily employed, and such other changes as are permissible by the appended claims, may be resorted to without departing from the spirit and scope of the invention.

What I claim and desire to secure by Letters Patent, is:—

1. A cooking utensil embodying a ring having inclined sides, a handle carried thereby, a receptacle revolubly mounted upon the upper edges of said ring, and having inner serrated edges, a revoluble roller supported by the side walls of said ring and engaging the upper edges of said receptacle, a pivoted bell crank lever carried by said handle, a movable pin carried by the shorter arm of said lever and adapted to overlie the upper edges of said receptacle, a spring carried by said handle for normally holding said pin out of engagement with said receptacle, and means to normally hold said receptacle out of engagement with the side walls of said ring.

2. A cooking utensil embodying a ring having side walls, a handle carried thereby, a receptacle revolubly mounted upon the upper edges of said side walls, means carried by said side walls and said handle for normally holding said receptacle in engagement with said ring, and means for preventing said receptacle from contacting with the side walls of said ring.

3. In a cooking utensil, a ring having upwardly extending side walls, a pan mounted within the side walls, revoluble supports carried by said pan engaging the upper edge of the side walls, a handle carried by the ring, a bracket carried by the ring at the side opposite the handle, a roller supported by said bracket and overlying the rim of the pan, and means carried by said handle also overlying the rim of the pan, said means and said roller maintaining the pan on the ring when revolved.

4. In a cooking utensil, a ring having upwardly extending side walls, a pan mounted to revolve within the side walls, flanged rollers carried by said pan resting on the rim of said side walls, and means overlying the rim of said pan for retaining the same in proper position within the ring while being revolved.

5. In a cooking utensil, a ring provided with an upwardly extending side wall, a pan mounted to be revolved around within the side wall, supports carried by said pan traveling on the rim of said side wall, a handle carried by said ring, and means carried by said handle projecting over the rim of the pan to hold the latter in position while being revolved.

6. In a cooking utensil, a ring, provided with upwardly extending side walls, a pan mounted for rotation within the side walls and having a serrated edge, supports secured to the periphery of the pan to rest and travel on the rim of said side walls as the pan is rotated, and means overlying the rim of the pan to maintain said supports in engagement with the rim of the side walls as the pan is rotated.

7. In a cooking utensil, a ring provided with upwardly extending side walls, a pan mounted for rotation within the side walls, and rollers carried by the periphery of said pan for supporting the same and traveling on the rim of the side walls as the pan is rotated.

In testimony whereof I affix my signature in the presence of two witnesses.

JOHN BEHRINGER.

Witnesses:
JOHN BERNIER,
JOSEPH MIKES.